Nov. 12, 1940.                    W. L. WOOLF                    2,221,661
                    SPEED CONTROL FOR SOUND RECORD MEDIUM
                           Filed March 22, 1940
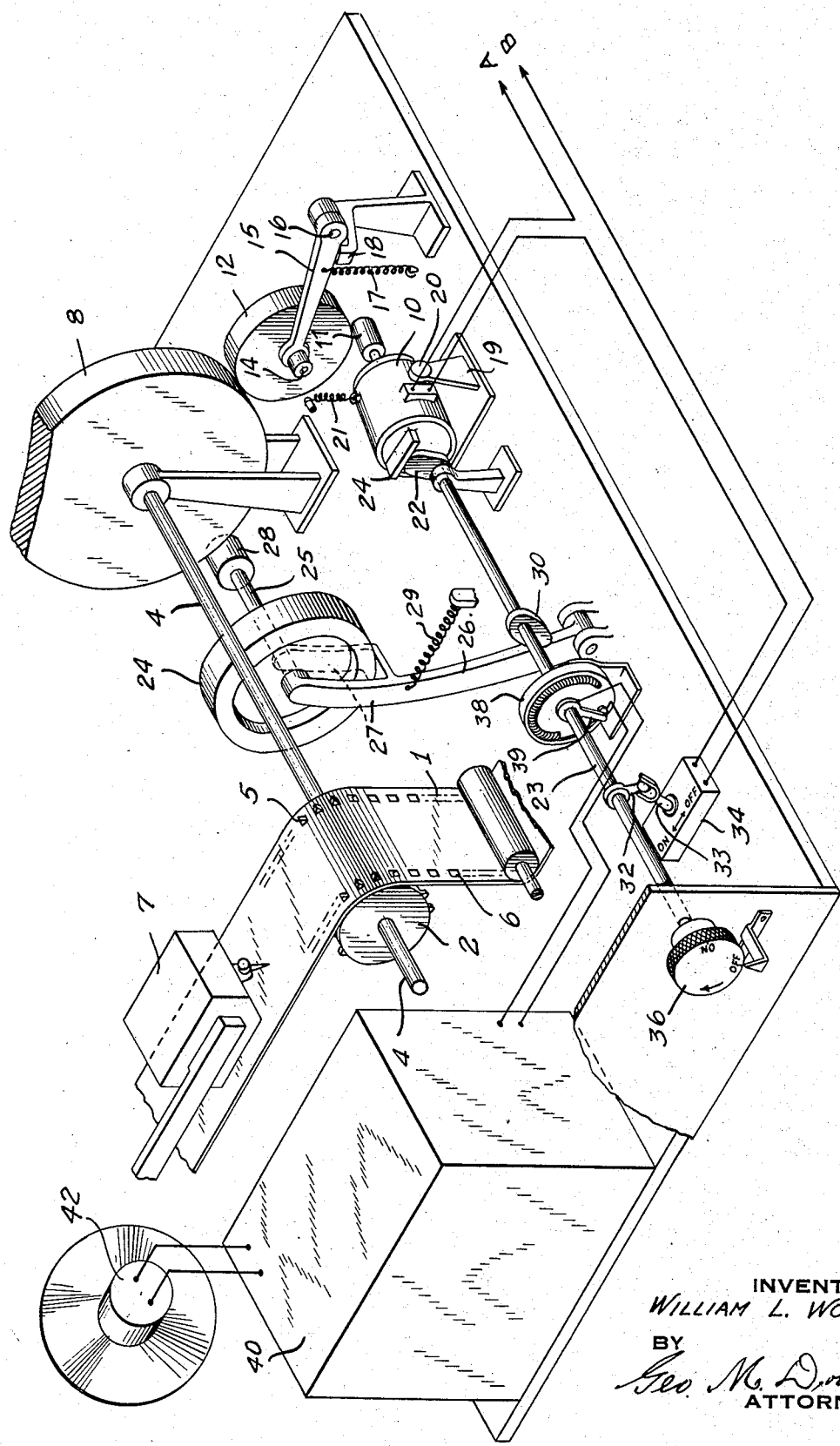
INVENTOR
WILLIAM L. WOOLF
BY
Geo. M. Dowe
ATTORNEY Patented Nov. 12, 1940

2,221,661

UNITED STATES PATENT OFFICE 2,221,661

SPEED CONTROL FOR SOUND RECORD MEDIUM

William L. Woolf, Bayside, Long Island, N. Y., assignor to Recordgraph Corporation, New York, N. Y., a corporation of Delaware Application March 22, 1940, Serial No. 325,290

10 Claims. (Cl. 271—2.3)

The present invention relates to sound recording and reproducing mechanism and more particularly to means whereby a uniform speed is given to the record medium.

An object of the invention is to provide a speed control which will permit the use of a relatively small high speed motor and to transmit the power of this motor to the film propelling means in a substantially noiseless manner.

A further object is to provide a high speed motor for furnishing power to the film propelling means and controlling the speed of the motor through the medium of a high speed low mass fly wheel.

Further objects include the provision of means to render operative or inoperative the connections between the motor and the high speed fly wheel.

It is highly important for good recording and reproducing that the record medium be propelled at a uniform speed. Where the mass of the record medium is substantial, as for instance, in the case of a phonograph disc supported on a turntable, the turntable and record themselves act somewhat as a fly wheel. When, however, the record medium consists of a film of extremely small mass, the problem of speed control is more complicated. In selecting a type of motor for use in propelling such a film, a compromise must be made between motors of high speed and motors of low speed. Low speed motors have high mass but low power, and have the advantage of being relatively freer from vibration than high speed small motors. The motor contemplated for use in the present invention is relatively small and of relatively high speed; for instance 3,600 revolutions per minute may be taken as an example. The record film is advanced at a relatively low rate of speed, as for example 40 or 50 feet per minute. A fly wheel of suitable diameter and mass is provided, and to bring about the desired speed reductions between the motor and film, which is driven through the fly wheel, the motor pulley must be small. To avoid vibration noise, the motor pulley should be of resilient material, such as rubber in order that its drive is relatively silent. An objection to a rubber pulley on the motor shaft directly engaging the fly wheel is due to the fact that such a pulley becomes smaller in diameter due to wear thereby causing a reduction of fly wheel speed. Similar objections apply to covering the fly wheel with a rubber rim. Such a construction, moreover, is expensive and does not wear well.

A feature of the present invention relates to the employment of a rubber idler roller between the metal motor pulley and the metal fly wheel. The reduction in size for such a rubber pulley by wear, does not change speed on the fly wheel, and of course, the motor pulley and fly wheel being of metal, do not change their shape or size to any appreciable extent due to wear by the rubber roller.

If such an idler pulley during prolonged periods of non-use were in constant contact with the motor pulley and the fly wheel, the pressure which necessarily must be exerted in order to create sufficient friction for the transmission of power, would tend to cause distortion of the rubber roller, such roller becoming somewhat elliptical or it may develop a flat side, either of which conditions, causes a jerky operation.

A further feature of the invention, therefore, relates to the provision of means whereby distortion of the rubber idler is avoided.

It has been stated that uniform speed control is preferably accomplished in the present invention by supplying a high speed fly wheel of relatively small mass. This high speed fly wheel, however, is not connected directly to the motor through the rubber idler above referred to, but is connected to a fly wheel of relatively large mass and the connecting means also consists of a rubber roller by which power is transmitted from the fly wheel of relatively large mass to the high speed fly wheel.

The details of construction whereby the various objects of the invention are accomplished, will best be understood from the following description and claims when taken in connection with the accompanying drawing in which:

The figure is a diagrammatic perspective view of those parts of the mechanism necessary to an understanding of its operation and function.

Referring to the drawing, the record medium 1 in the form of a film may be propelled through the machine in any desired manner. In the present embodiment, a sprocket 2 mounted on a shaft 4 is provided with teeth 5 which engage perforations 6 formed in the film. A sound head 7, which may be either a recording head or a reproducing head, is mounted adjacent the film. Secured to the shaft 4 is a relatively large fly wheel 8.

Power for rotating fly wheel 8 and thereby propelling the film through the medium of the shaft 4 and sprocket 5 is provided by a motor 10 whose shaft carries a metal pulley 11. This pulley is adapted to engage a rubber roller 12 mounted on a stub shaft 14 carried by an arm 15 pivoted at 16. A spring 17 normally tends to move the arm 15 and its rubber roller 12 to a position to disengage the roller 12 from the fly wheel 8. A stop 18 is provided to limit such movement of the arm 15 under action of its spring. The motor is supported in a base 19 and is capable of a slight rocking motion on its pivots 20, only one of which is shown in the drawing. A spring 21 connected to the motor and to some stationary part of the machine tends to rock the motor in an anti-clockwise direction to cause the motor pulley 11 to make contact with the rubber roller 12 and to press said roller against the periphery of the fly wheel 8 with sufficient pressure to transmit the power of the motor to said fly wheel. The ratio of transmission is such that the fly wheel 8 rotates relatively slowly as compared with the motor.

In the drawing the rubber roller 12 is disengaged from both the fly wheel 8 and the motor pulley 11, the roller 12 being held disengaged through the action of the spring 17.

The motor is maintained in the position shown in the drawing by means of a cam 22 secured to shaft 23, the cam engaging a part 24 projecting from the motor casing. With the cam 22 in the position shown, the power of the spring 21 is overcome and the pulley 7 is disengaged from the rubber roller 12. It is apparent that if the cam 22 were moved in a clockwise direction, through a sufficient angle, the spring 21 would then act to rock the motor about its pivotal points and cause the motor pulley 11 to press the rubber roller 12 against the fly wheel 8.

While the fly wheel 8 has been referred to as having relatively large mass, this designation is intended for purposes of description and not as a limitation. In fact the fly wheel 8 is in the present invention of much smaller mass than usually required because of the provision of a second high speed fly wheel by which the speed of propulsion of the film is primarily controlled. This high speed fly wheel is indicated at 24 and its shaft 25 is pivoted to arms 26 and 27, the latter arm being formed as a part of the arm 26 as shown. Secured to the shaft 25 beyond the arm 27 is a second rubber roller 28 which may be engaged with and disengaged from contact with the fly wheel 8. A spring 29 connected to the arm 26 and to a stationary part of the machine urges the arm 26 in a clockwise direction to cause the roller 28 to engage the fly wheel 8. Under the conditions shown in the drawing, the action of the spring 29, however, is resisted by a cam 30, also secured to the shaft 23. The cam, as positioned in the drawing, acts to hold roller 28 out of engagement with the fly wheel 8.

The shaft 23 in addition to controlling the position of the cams 22 and 30 also controls the closing and opening of the motor circuit. To this end the shaft 23 carries a downwardly extending arm 32, the lower end of which engages the yoke-like member 33 which in a manner well known in the art, operates a switch, located in a switch box 34. The shaft 23 is rotated in one direction or the other by a knob 36 secured to its left hand end. The current for the motor is supplied from some source of electrical energy indicated at A and B. With the parts positioned as shown in the drawing, movement of the shaft 23 in a clockwise direction first causes the arm 32 to rock the yoke 33 and thereby close the motor circuit. The motor immediately starts. The cam 22, however, is so shaped that this first movement of the shaft 23 does not permit the motor to be rocked. Further movement however, of the shaft 23 and cam 22 permits the spring 21 to become effective to rock the motor about its pivots to thereby cause the rubber roller 12 to be pressed against the fly wheel 8 through the medium of the motor pulley 11. So far, however, the cam 30 continues to hold the arm 26 in position so that the roller 28 is disengaged from the fly wheel 8. As the motor speeds up and the wheel 8 acquires momentum, the cam 30 releases the arm 26 which moves under action of the spring 29 to engage the roller 28 with the fly wheel 8.

The shaft 23 also carries a potentiometer 38 having a pointer 39. The potentiometer is ineffective while the knob 36 is moving from "off" position to "on" position. During such movement, however, the several operations, above described, take place. Thereafter the potentiometer becomes effective and may be in the input volume control on an amplifier 40 used in either recording or reproducing. In reproducing the potentiometer is connected through the amplifier to a loud speaker 42.

By this sequence of operation, the motor is first started without load. Its pulley 11 then presses against the rubber roller 12 and the fly wheel 8 begins to rotate. When the fly wheel has attained sufficient momentum, the high speed fly wheel 24 is engaged with the fly wheel 8. Thus a load of considerable magnitude may be imposed upon a small motor whereas if the entire load were imposed with the motor standing still, it would in all probability not start and the windings might be damaged.

The roller 28 is small in diameter compared with the fly wheel 8, in consequence of which the fly wheel 24 rotates at high velocity and tends to keep the feed of the film uniform.

When the shaft 23 is returned to normal position by rotation of the knob 36, anti-clockwise, the first result is to disconnect roller 28 from fly wheel 8. Next roller 12 is disconnected and lastly the motor is deenergized.

What I claim is:

1. In a recording or reproducing mechanism, means for propelling a record medium in the form of a film, a fly wheel for controlling the motion of said propelling means, a second fly wheel normally disconnected from said first mentioned fly wheel, and means for connecting said second fly wheel to the first fly wheel when the latter has acquired momentum.

2. In a recording or reproducing mechanism, means for propelling a record medium in the form of a film, a fly wheel for controlling the motion of said propelling means, a motor for driving said fly wheel, and a connection from said motor to said fly wheel normally disconnected from both the fly wheel and motor.

3. In a recording or reproducing mechanism, means for propelling a record medium in the form of a film, a fly wheel for controlling the motion of said propelling means, a motor for driving said fly wheel, a rubber roller by which motion is transmitted from the motor to the fly wheel normally disconnected from both the fly wheel and motor.

4. In a recording or reproducing mechanism, means for propelling a record medium in the form of a film, a fly wheel for controlling the motion of said propelling means, a motor for driving said fly wheel, a circuit for said motor, a connection from said motor to said fly wheel normally disconnected from both the fly wheel and motor, and means for closing the motor circuit and subsequently rendering said connections effective.

5. In a recording or reproducing mechanism, means for propelling a record medium in the form of a film, a high speed fly wheel, a motor for rotating said fly wheel, a low speed fly wheel for transmitting power from said motor to said high speed fly wheel, connections between said motor and low speed fly wheel and between said low speed fly wheel and said high speed fly wheel.

6. In a recording or reproducing mechanism, means for propelling a record medium in the form of a film, a high speed fly wheel, a motor for rotating said fly wheel, a low speed fly wheel for transmitting power from said motor to said high speed fly wheel, connections between said motor and low speed fly wheel and between said low speed fly wheel and said high speed fly wheel, said connections being normally ineffective.

7. In a recording or reproducing mechanism, means for propelling a record medium in the form of a film, a high speed fly wheel, a motor for rotating said fly wheel, a low speed fly wheel for transmitting power from said motor to said high speed fly wheel, connections between said motor and low speed fly wheel and between said low speed fly wheel and said high speed fly wheel, said connections being normally ineffective, and means for energizing said motor and rendering said connections effective.

8. In a recording or reproducing mechanism, means for propelling a record medium in the form of a film, a high speed fly wheel, a motor for rotating said fly wheel, a low speed fly wheel for transmitting power from said motor to said high speed fly wheel, connections between said motor and low speed fly wheel and between said low speed fly wheel and said high speed fly wheel, said connections being normally ineffective, means for energizing said motor and rendering said connections effective, and means for rendering said connections ineffective on deenergizing said motor.

9. In a recording or reproducing mechanism, means for propelling a record medium in the form of a film, a shaft for said propelling means, a fly wheel secured to said shaft, a motor for driving said fly wheel, a second fly wheel, a resilient roller for connecting said motor to said first fly wheel, and a resilient roller for connecting said first fly wheel to said second fly wheel, both said resilient rollers being normally disconnected from said first mentioned fly wheel.

10. In a recording or reproducing mechanism, means for propelling a record medium in the form of a film, a metal fly wheel for controlling the motion of said propelling means, a motor for driving said fly wheel, a motor shaft, a metal pulley on said shaft, and a rubber roller for transmitting power from said motor to said fly wheel, said rubber roller normally disconnected from both the fly wheel and motor pulley.

WILLIAM L. WOOLF.